United States Patent [19]

Sakamoto et al.

[11] Patent Number: 5,495,996
[45] Date of Patent: Mar. 5, 1996

[54] CABLE REEL

[75] Inventors: Yoshito Sakamoto; Haruo Saen, both of Tochigi, Japan

[73] Assignee: Sumitomo Electric Industries, Ltd., Osaka, Japan

[21] Appl. No.: 258,489

[22] Filed: Jun. 10, 1994

[30] Foreign Application Priority Data

Jun. 14, 1993 [JP] Japan .................................. 5-141635

[51] Int. Cl.⁶ .................................................. H01R 35/04
[52] U.S. Cl. ............................................. 242/402; 439/15
[58] Field of Search ................................ 242/388, 388.1, 242/388.5, 388.6, 402; 439/13, 15, 162, 163, 164

[56] References Cited

U.S. PATENT DOCUMENTS 4,838,803  6/1989  Kondo .
4,975,063  12/1990  Ida et al. .
5,229,544  7/1993  Horiuchi et al. ........................... 439/13
5,256,075  10/1993  Miyahara et al. ......................... 439/15

FOREIGN PATENT DOCUMENTS 0561280  9/1993  European Pat. Off. .
4236279  4/1993  Germany .

*Primary Examiner*—John P. Darling
*Attorney, Agent, or Firm*—Cushman Darby & Cushman

[57] ABSTRACT

A cable reel using a tape-shaped cable including a high-strength conductor having a tensile strength of 500 to 1500 N/mm², an elongation percentage of 0.5 to 50% and a spring limitation value of 400 to 2000 N/mm². Accordingly, in such a cable reel, weight as well as cost of the whole or parts in a cable reel can be reduced.

16 Claims, 1 Drawing Sheet

CABLE REEL

BACKGROUND OF THE INVENTION

1. Field of the Invention

The present invention relates to a cable reel adapted for performing electrical connection between a stationary matter and a movable matter by using a tape-shaped cable and particularly relates to a cable reel suitable for use in a steering apparatus of a vehicle.

2. Description of the Related Art

When signal transmission is performed between the handle side of a car and the car body side of the car, a device such as that shown in FIG. 1 is used. Namely, a tape-shaped cable is spirally housed in a housing having an inner cylinder and an outer cylinder so that the rotation of a handle is absorbed by tightening and loosening of the winding of the tape-shaped cable.

Recently, requirements for reductions of weight of car parts and for reductions in cost thereof have increased more strongly. The case of a cable reel is not exceptional. To attain the weight reductions of the cable reel and a cost reduction thereof, it is necessary to make the tape-shaped cable thinner, and to this end, it is necessary to make the conductor thinner. When ordinary tough pitch copper is used as the conductor and such copper is made thinner, there arises a problem that durability against repeated rotation is lowered.

SUMMARY OF THE INVENTION

It is an object of the present invention to provide a cable reel in which a tape-shaped cable is effective for reduction of the weight and cost of the cable reel without lowering the durability against rotation in spite of the reduction in thickness.

In order to achieve the above object, the cable reel of the present invention includes a housing having an inner cylinder and an outer cylinder, and tape-shaped cable which is spirally housed in said housing including a high-strength conductor, wherein said cable reel absorbs the relative rotation by tightening and loosening of the winding of the tape-shaped cable.

BRIEF DESCRIPTION OF THE DRAWINGS

In the accompanying drawings.

PREFERRED EMBODIMENTS OF THE PRESENT INVENTION

The preferred embodiments of the present invention will be described referring to the accompanying drawings.

Figure 1:
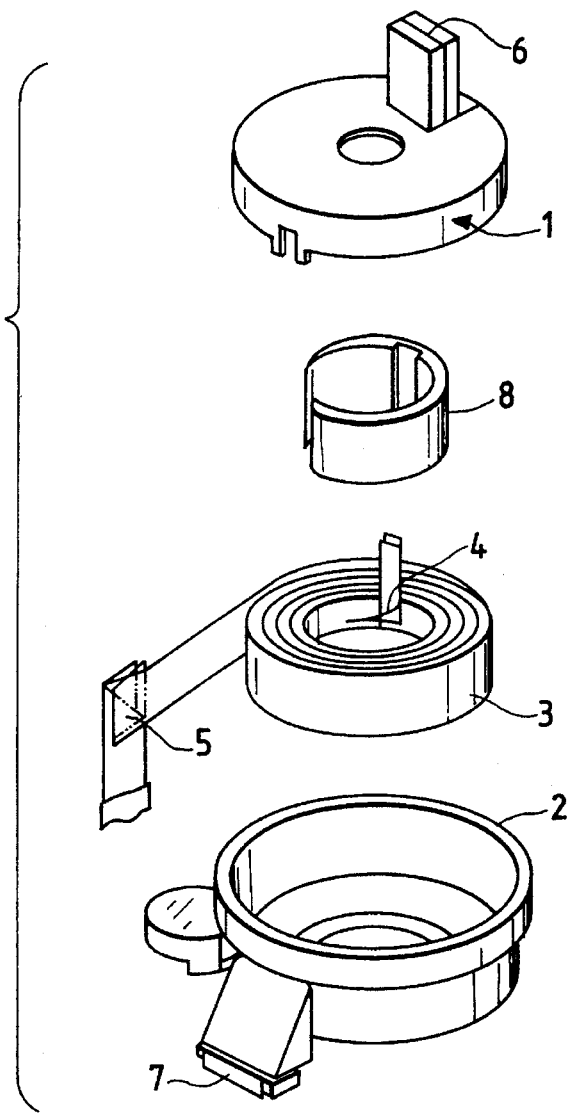
FIG. 1 is a view showing a condition before a cable reel of the present invention is assembled.
Figure 2:
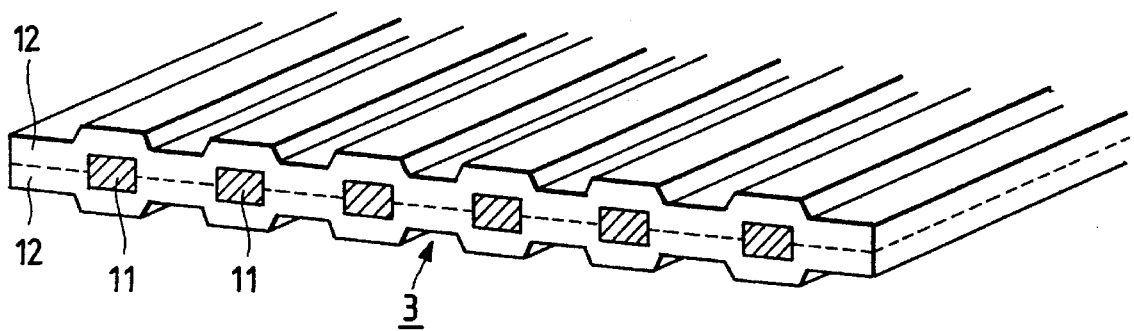
FIG. 2 is a perspective view showing one example of a tape-shaped cable.

A preferable tape-shaped cable used in the present embodiment includes a plurality of conductors therein. For example, six conductors are laminated between insulated materials with adhesive from the upper and lower sides thereof as shown in FIG. 2. As shown in FIG. 2, the tape-shaped cable 3 includes conductors 11 and insulated members 12 for laminating to each other to hold the conductors 11 therebetween. As shown in FIG. 1, the cable reel includes a housing having an outer cylinder 2, inner cylinder 1 and holder 8, and the tape-shaped cable 3 housed therein. An end holding portion 4 of the tape-shaped cable 3 is held by the inner cylinder 1 and holder 8. A beginning holding portion 5 is held by the outer cylinder 2. The end holding portion 4 and beginning holding portion 5 are introduced to the outside of the housing through an inner cylinder hole 6 and outer cylinder hole 7, respectively, so as to connect to a control unit, circuit of an inflator or the like. The outer cylinder 2 and inner cylinder 1 are supported rotatably with respect to each other. Further, the inner cylinder 1 is fixed so as to rotate in accordance with the rotation of a handle of a vehicle or the like. In this state, the inner cylinder 1 is rotated in accordance with the rotation of the handle, however such a rotation is absorbed by spirally tightening and loosening of the winding of the tape-shaped cable 3, so that the electrical connection through the tape-shaped cable 3 can be always maintained. In such a tape-shaped cable, polyester or PET (polyethylene terephtalete) film is preferably used as the insulated member. Preferable conductive material used as the conductor is copper foil, tin plated copper foil, copper-tin alloy, copper-silver alloy or the like. Further, a preferable conductor of the embodiment has a tensile strength of 500 to 1500 $N/mm^2$, preferably 500 to 900 $N/mm^2$, elongation percentage of 0.5 to 50%, preferably 0.5 to 10%, spring limitation value of 400 to 2000 $N/mm^2$, preferably 400 to 700 $N/mm^2$, and thickness of 0.01 to 0.1 mm, preferably 0.03 to 0.1 mm. The conductor of a tape-shaped cable is effective for reducing the weight and cost of the cable reel without lowering the durability against rotation in spite of the reduction in thickness.

EXAMPLES

With respect to the fourteen kinds of conductors shown in Table I, tape-shaped cables were prepared respectively as examples or comparative example of this embodiment. Each of the tape-shaped cables was produced by arranging six 1.0 mm-wide conductors in parallel at intervals of a pitch of 1.5 mm and then laminating the conductors with polyester tapes with adhesive from the upper and lower sides thereof. By using these tape-shaped cables, the respective motions of the tape-shaped cables in the cable reel were simulated so that durability against rotation was tested. Results of the test were as shown in the right-end column of Table I.

As shown in Table I, in the case where each of high-strength conductors Nos. 1 to 7 having a tensile strength of 500 to 900 $N/mm^2$, an elongation percentage of 0.5 to 7.0% and a spring threshold value of 400 to 700 $N/mm^2$ is used as the conductor. A good result being that durability against rotation is not smaller than 3,000,000 times is obtained though the thickness of the conductor is reduced to be in a range of from 0.1 mm to 0.03 mm, so that there arise remarkable effects for reduction in weight as well as cost of the cable reel.

TABLE I

Characteristic of Various Kinds of Conductors

|  | No. | Conductor Thickness (mm) | Ts (N/mm$^2$) | Ecl (%) | Dielectric Constant (%) | Spring Limitation Value (N/mm$^2$) | Durability against Rotation of Cable Reel (Times) |
| --- | --- | --- | --- | --- | --- | --- | --- |
| EXAMPLES | 1 | 0.05 | 760 | 1.0 | 58 | 580 | >3,000,000 |
|  | 2 | 0.1 | 690 | 1.5 | 61 | 550 | >3,000,000 |
|  | 3 | 0.05 | 600 | 0.5 | 43 | 450 | >3,000,000 |
|  | 4 | 0.1 | 540 | 0.9 | 46 | 430 | >3,000,000 |
|  | 5 | 0.05 | 550 | 5.0 | 35 | 400 | >3,000,000 |
|  | 6 | 0.1 | 520 | 6.5 | 41 | 410 | >3,000,000 |
|  | 7 | 0.03 | 810 | 0.7 | 30 | 650 | >3,000,000 |
| Comparative Example | 8 | 0.1 | 400 | 0.5 | 95 | 210 | 2,500,000 |
|  | 9 | 0.1 | 250 | 1.0 | 93 | 150 | 2,000,000 |
|  | 10 | 0.1 | 200 | 10.0 | 96 | 120 | 1,800,000 |
|  | 11 | 0.05 | 420 | 0 | 92 | 230 | 2,100,000 |
|  | 12 | 0.05 | 290 | 3.5 | 94 | 170 | 1,600,000 |
|  | 13 | 0.05 | 210 | 9.5 | 93 | 100 | 1,500,000 |
|  | 14 | 0.15 | 250 | 1.0 | 93 | 150 | >3,000,000 |

Note 1) Ts:Tensile Strength, Ecl:Elongation Percentage "M JIS Z 2241
Note 2) Dielectric Constant "M JIS H 0505
Note 3) Spring Limitation Value "M JIS H 3130
Note 4) As durability against rotation, the number of times of winding and rewinding up to the breaking of the conductor was measured in the condition in which three-times winding and rewinding was applied to a 15 mm-diameter pipe.

What is claimed is:

1. A cable reel comprising:

a housing including an inner cylinder having an inner cylinder hole and an outer cylinder having an outer cylinder hole; and a tape-shaped cable which is spirally housed in said housing, both end portions of said tape-shaped cable being introduced to outside of said housing through said inner cylinder hole and said outer cylinder hole, respectively;

wherein said tape-shaped cable includes at least one high-strength conductor having a tensile strength of from 500 to 1500 N/mm$^2$, an elongation percentage of 0.5 to 50% and a spring limitation value of 400 to 2000 N/mm$^2$; and wherein said cable reel absorbs relative rotation between an external member that generates an external force and said inner cylinder by tightening and loosening of windings of said tape-shaped cable.

2. A cable reel according to claim 1, wherein thickness of said conductor is from 0.01 to 0.1 mm.

3. A cable reel according to claim 1, wherein said tape-shaped cable includes a plurality of said conductors and insulated members for laminating to each other to hold said conductors therebetween.

4. A cable reel as claimed in claim 1, wherein said cable reel is adapted for use in an automobile.

5. A cable reel comprising:

a housing including an inner cylinder having an inner cylinder hole and an outer cylinder having an outer cylinder hole; and a tape-shaped cable which is spirally housed in said housing, both end portions of said tape-shaped cable being introduced to outside of said housing through said inner cylinder hole and said outer cylinder hole, respectively;

wherein said tape-shaped cable includes at least one high-strength conductor having a tensile strength of from 500 to 1500 N/mm$^2$; and wherein said cable reel absorbs relative rotation between an external member that generates an external force and said inner cylinder by tightening and loosening of windings of said tape-shaped cable.

6. A cable reel according to claim 5, wherein said conductor includes an elongation percentage of 0.5 to 50%.

7. A cable reel according to claim 5, wherein said conductor includes a spring limitation value of from 400 to 2000 N/mm$^2$.

8. A cable reel according to claim 5, wherein said tape-shaped cable includes a plurality of said conductors and insulated members laminated to one another to hold said conductors therebetween.

9. A cable reel according to claim 5, wherein said reel is adapted for use in an automobile.

10. A cable reel comprising:

a housing including an inner cylinder having an inner cylinder hole and an outer cylinder having an outer cylinder hole; and a tape-shaped cable which is spirally housed in said housing, both end portions of said tape-shaped cable being introduced to outside of said housing through said inner cylinder hole and said outer cylinder hole, respectively;

wherein said tape-shaped cable includes at least one high-strength conductor having an elongation percentage of 0.5 to 50%; and wherein said cable reel absorbs relative rotation between an external member that generates an external force and said inner cylinder by tightening and loosening of windings of said tape-shaped cable.

11. A cable reel according to claim 10, wherein said conductor has a spring limitation value of from 400 to 2000 N/mm$^2$.

12. A cable reel according to claim 10, wherein said tape-shaped cable includes a plurality of said conductors and insulated members laminated to one another to hold said conductors therebetween.

13. A cable reel according to claim 10, wherein said reel is adapted for use in an automobile.

14. A cable reel comprising:

a housing including an inner cylinder having an inner cylinder hole and an outer cylinder having an outer cylinder hole; and a tape-shaped cable which is spirally housed in said housing, both end portions of said tape-shaped cable being introduced to outside of said housing through said inner cylinder hole and said outer cylinder hole, respectively;

wherein said tape-shaped cable includes at least one high-strength conductor having a spring limitation value of from 400 to 2000 N/mm$^2$; and wherein said cable reel absorbs relative rotation between an external member that generates an external force and said inner cylinder by tightening and loosening of windings of said tape-shaped cable.

15. A cable reel according to claim 14, wherein said tape-shaped cable includes a plurality of said conductors and insulated members laminated to one another to hold said conductors therebetween.

16. A cable reel according to claim 14, wherein said reel is adapted for use in an automobile.

* * * * *